US012613533B2

(12) United States Patent
Wanda et al.

(10) Patent No.: US 12,613,533 B2
(45) Date of Patent: Apr. 28, 2026

(54) INFORMATION PROCESSING APPARATUS, MOVABLE APPARATUS, INFORMATION PROCESSING METHOD, AND STORAGE MEDIUM

(71) Applicant: CANON KABUSHIKI KAISHA, Tokyo (JP)

(72) Inventors: Koichiro Wanda, Kanagawa (JP); Haruma Akimoto, Tokyo (JP); Masakazu Fujiki, Kanagawa (JP); Kazuhiko Kobayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 37 days.

(21) Appl. No.: 18/629,786

(22) Filed: Apr. 8, 2024

(65) Prior Publication Data

US 2024/0345595 A1      Oct. 17, 2024

(30) Foreign Application Priority Data

Apr. 12, 2023      (JP) ................................. 2023-064611

(51) Int. Cl.
| | |
|---|---|
| *G05D 1/633* | (2024.01) |
| *G05D 1/644* | (2024.01) |
| *G05D 1/693* | (2024.01) |
| *G05D 107/70* | (2024.01) |
| *G05D 111/30* | (2024.01) |

(52) U.S. Cl.
CPC ............. *G05D 1/633* (2024.01); *G05D 1/644* (2024.01); *G05D 1/693* (2024.01); *G05D 2107/70* (2024.01); *G05D 2111/32* (2024.01)

(58) Field of Classification Search
CPC ........ G05D 1/633; G05D 1/644; G05D 1/693; G05D 1/225; G05D 2107/70; G05D 2111/32; G05D 2109/10
See application file for complete search history.

(56) References Cited

U.S. PATENT DOCUMENTS

| | | | | |
|---|---|---|---|---|
| 2016/0062345 A1* | 3/2016 | Stubbs | ............. | G05B 19/41895 |
| | | | | 701/2 |
| 2020/0205629 A1* | 7/2020 | Hong | ................... | G05D 1/0231 |
| 2020/0391386 A1* | 12/2020 | Verma | ................... | B25J 9/1676 |

FOREIGN PATENT DOCUMENTS

| | | | | | |
|---|---|---|---|---|---|
| JP | 2009110495 A | | 5/2009 | | |
| JP | 2016012257 A | * | 1/2016 | | |
| WO | WO-2021220679 A1 | * | 11/2021 | ................ | B25J 5/00 |
| WO | WO-2024195482 A1 | * | 9/2024 | ................ | G08G 1/00 |

* cited by examiner

*Primary Examiner* — Michael J Zanelli
(74) *Attorney, Agent, or Firm* — Canon U.S.A, Inc., IP Division

(57) ABSTRACT

An information processing apparatus acquires a route plan of a movable apparatus; acquires information regarding an obstacle factor hindering a way of the route plan of the movable apparatus; calculates the degree of obstacle for the route plan of the movable apparatus based on the information regarding the obstacle factor; determines an obstacle countermeasure for reducing the degree of obstacle based on the information regarding the obstacle factor and the route plan; and performs at least one of control for causing the obstacle factor evacuate and control for the movable apparatus to avoid the obstacle factor based on the obstacle countermeasure.

10 Claims, 7 Drawing Sheets

INFORMATION PROCESSING APPARATUS, MOVABLE APPARATUS, INFORMATION PROCESSING METHOD, AND STORAGE MEDIUM

BACKGROUND

Field

The present disclosure relates to an information processing apparatus, a movable apparatus, an information processing method, and a storage medium.

Description of the Related Art

In recent years, movable robots or automated guided vehicles (AGVs) have operated in various facilities such as factories or distribution warehouses. In environments where such people and robots coexist, objects or people temporarily occupying routes may be obstacles to operations of the robots due to work such as exchange of lighting fixtures, collection and distribution of goods in factories and warehouses, and maintenance of machinery. Japanese Patent Laid-Open No. 2009-110495 discloses a technique for avoiding a movement route when something obstructs a traveling path.

In Japanese Patent Laid-Open No. 2009-110495, however, when a worker occupies a travel path, a movable robot may have to be removed and work efficiency deteriorates even if the efficiency of the worker in removing the movable robot is good.

SUMMARY OF THE INVENTION

According to an aspect of the present disclosure, an information processing apparatus includes at least one memory storing instructions; and at least one processor that upon execution of the stored instructions is configured to function as:

a route plan acquisition unit configured to acquire a route plan of a movable apparatus;

an obstacle information acquisition unit configured to acquire information regarding an obstacle hindering a way of the acquired route plan of the movable apparatus;

a degree-of-obstacle calculation unit configured to calculate the degree of obstacle for the route plan of the movable apparatus based on the acquired information regarding the obstacle;

an obstacle countermeasure determination unit configured to determine an obstacle countermeasure for reducing the degree of obstacle based on the acquired information regarding the obstacle and the acquired route plan; and a control unit configured to perform at least one of control for causing the obstacle factor evacuate and control for the movable apparatus along a path that avoids the obstacle.

Further features of the present disclosure will become apparent from the following description of embodiments with reference to the attached drawings.

DESCRIPTION OF THE EMBODIMENTS

Hereinafter, with reference to the accompanying drawings, the present disclosure will be described using Embodiments. In each diagram, the same reference signs are applied to the same members or elements, and duplicate description will be omitted or simplified.

In embodiments of the present disclosure provide a system capable of calculating a degree of obstacle for the route plan of a movable apparatus. The system can calculate the degree of obstacle for both an obstacle object such as a person and a movable apparatus such as a robot, and reducing deterioration in work efficiency for both the obstacle object and the movable apparatus.

First Embodiment

Figure 1:
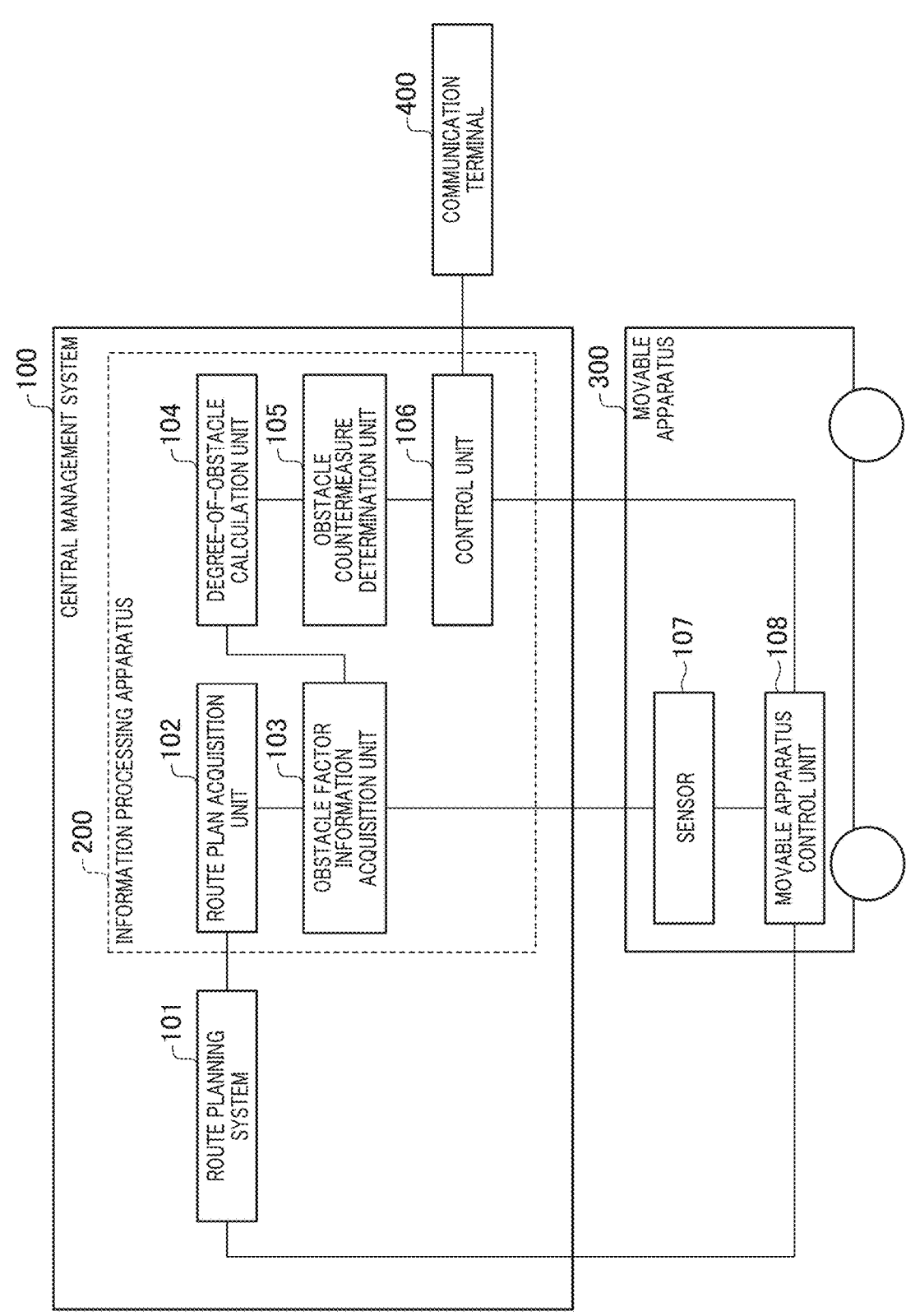
FIG. 1 is a functional block diagram illustrating a configuration example of an information processing system according to a first embodiment of the present disclosure.

FIG. 1 is a functional block diagram illustrating a configuration example of an information processing system according to a first embodiment of the present disclosure. Some of the functional blocks illustrated in FIG. 1 are implemented by causing a CPU or the like serving as a computer included in an information processing system to execute a computer program stored in a memory serving as a storage medium.

However, the some or all of the functional block may be implemented by hardware. A dedicated circuit (ASIC), a processor (a reconfigurable processor or a DSP), or the like can be used as hardware.

The functional blocks illustrated in FIG. 1 may not be embedded in the same housing or may be configured by other apparatuses connected to each other via a signal line. The above description in FIG. 1 similarly applies to FIGS. 4 and 7.

A central management system 100 includes an information processing apparatus 200 and a route planning system 101. The central management system 100 can communicate with a movable apparatus 300 and a communication terminal 400 via a network such as a wireless LAN.

The movable apparatus 300 is, for example, an autonomous mobile robot (AMR), an automated guided vehicle (AGV), an automated driving vehicle, a cleaning robot, a drone, or the like. In the first embodiment, an example in which an automated guided vehicle is applied as the movable apparatus 300 will be described.

The information processing apparatus 200 includes a route plan acquisition unit 102, an obstacle factor information acquisition unit 103, a degree-of-obstacle calculation unit 104, an obstacle countermeasure determination unit 105, and a control unit 106. A CPU serving as a computer is embedded in the control unit 106, as will be described below, and controls an operation of each unit of an entire information processing apparatus based on a computer program stored in a memory serving as a storage medium.

The degree-of-obstacle calculation unit 104 calculates the degree of obstacle based on information acquired by the route plan acquisition unit 102 and the obstacle factor information acquisition unit 103, and the control unit 106 controls the movable apparatus 300 or the communication terminal 400 in accordance with a countermeasure method determined by the obstacle countermeasure determination unit 105. The degree of obstacle is a numerical value indicating easiness of movement of a worker 500 that is an obstacle object, and will be described in detail below.

The route plan acquisition unit 102 acquires a route plan and position and orientation information of the movable apparatus 300 or route plan information such as priority of guiding of the movable apparatus 300 from the route planning system 101 and transmits the route plan and the position and orientation information to the obstacle factor information acquisition unit 103. The route plan is information such as a map related to a traveling route of the movable apparatus 300 or a transit point for determining the traveling route determined on a coordinate system of the map.

The obstacle factor information acquisition unit 103 acquires an image obtained by imaging the worker 500 that is an obstacle factor with a camera that is a sensor 107 of the movable apparatus 300, acquires movable apparatus information acquired from the route plan acquisition unit, and transmits the image and the movable apparatus information as obstacle factor information to the degree-of-obstacle calculation unit 104.

The degree-of-obstacle calculation unit 104 calculates the degree of obstacle based on the movable apparatus information and the obstacle factor information acquired from the obstacle factor information acquisition unit 103. The degree-of-obstacle calculation unit 104 transmits a value of the calculated degree-of-obstacle group to the obstacle countermeasure determination unit 105.

The obstacle countermeasure determination unit 105 determines the obstacle countermeasure based on the degree of obstacle acquired from the degree-of-obstacle calculation unit 104 and transmits the obstacle countermeasure to the control unit 106.

The control unit 106 communicates with the movable apparatus 300 and the communication terminal 400 based on the obstacle countermeasure acquired from the obstacle countermeasure determination unit 105. The movable apparatus 300 includes the sensor 107 and a movable apparatus control unit 108.

The sensor 107 according to the first embodiment is, for example, a camera. A captured image is used for the movable apparatus control unit 108 to estimate an own position and is transmitted to the obstacle factor information acquisition unit 103. The communication terminal 400 is a smartphone or a tablet portable terminal carried by the worker 500.

The worker 500 is identified and a position of the worker is specified with the communication terminal 400. The communication terminal 400 may be provided in a work tool 501 used for work by the worker 500.

The movable apparatus control unit 108 controls movement of the movable apparatus 300. In the first embodiment, an own position of the moveable apparatus 300 is estimated with SLAM in which feature points of a captured image are used. That is, it is assumed that the movable apparatus is traveling based on information regarding transit points and a map prepared in advance for waypoint navigation in which a plurality of transit points are sequentially controlled and followed using the transit points formed by positions and orientations set on a preset coordinate system of the map.

The movable apparatus control unit 108 includes, for example, a driving source such as a motor and functions as a driving control unit that controls movement (driving), stopping, a traveling direction, and the like of the movable apparatus 300 based on an output of the control unit 106.

Figure 2:
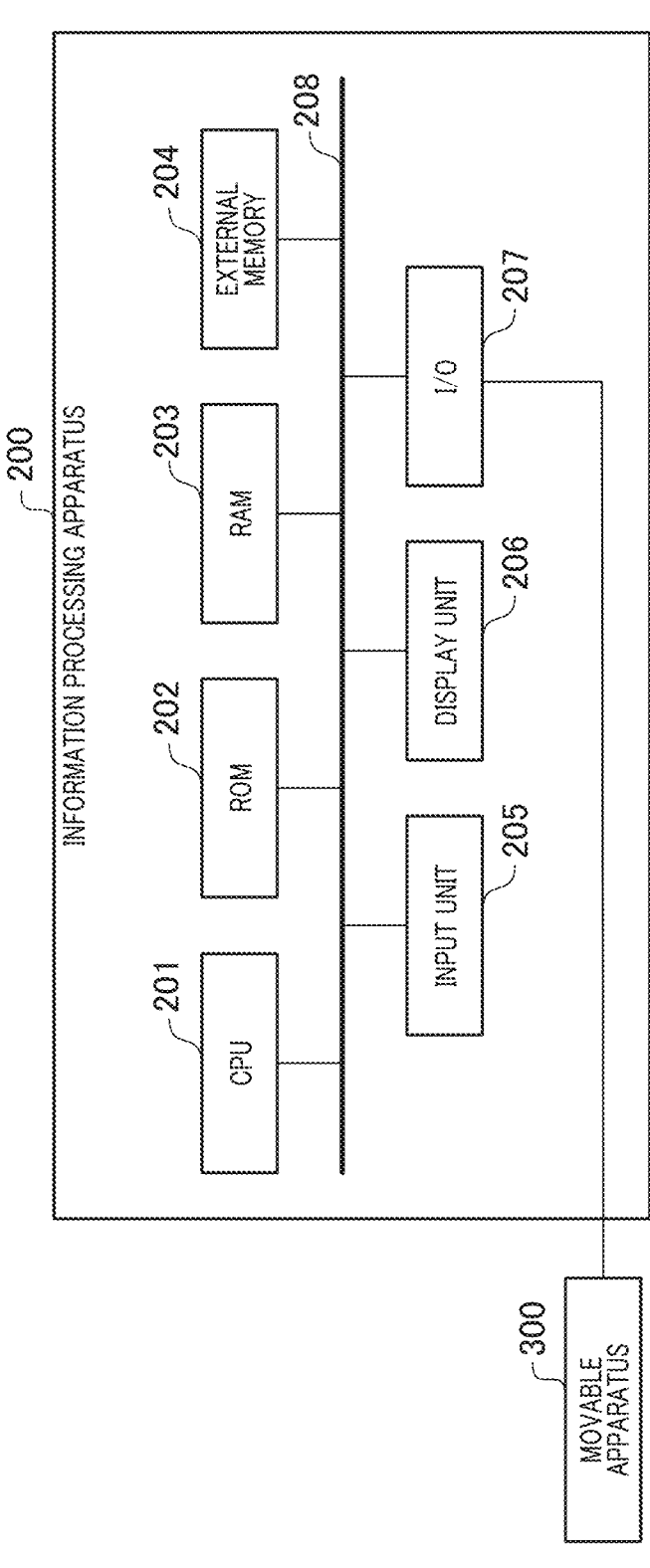
FIG. 2 is a diagram illustrating a hardware configuration example of an information processing apparatus 200 according to the first embodiment of the present disclosure.

FIG. 2 is a diagram illustrating a hardware configuration example of the information processing apparatus 200 according to the first embodiment of the present disclosure. The information processing apparatus 200 includes a CPU 201 serving as a computer and controls various devices connected via a system bus 208.

A ROM 202 stores a boot program or a program of a basic input output system (BIOS) used by the information processing apparatus 200. A RAM 203 is used as a main storage device of the CPU 201. An external memory 204 functions as a storage medium that stores data or a program used by the information processing apparatus 200.

An input unit 205 includes an input device that performs an operation of a controller that controls a keyboard, a pointing device, or the movable apparatus, performs an operation of a button or the like, and inputs information. The display unit 206 displays a result of a calculation process of the information processing apparatus 200 in response to an instruction of the CPU 201. The display unit 206 includes a liquid crystal device, a projector, or a display device such as an LED indicator.

An I/O 207 is a communication interface unit and performs information communication with an external apparatus via a network or the like. Ethernet (registered trademark), a Universal Serial Bus (USB), serial communication, wireless communication, or the like can be used for the I/O 207 and any type of communication can be used. A measurement value of a sensor or data related to measurement in the information processing apparatus 200 can be acquired through the I/O 207.

Figure 3:
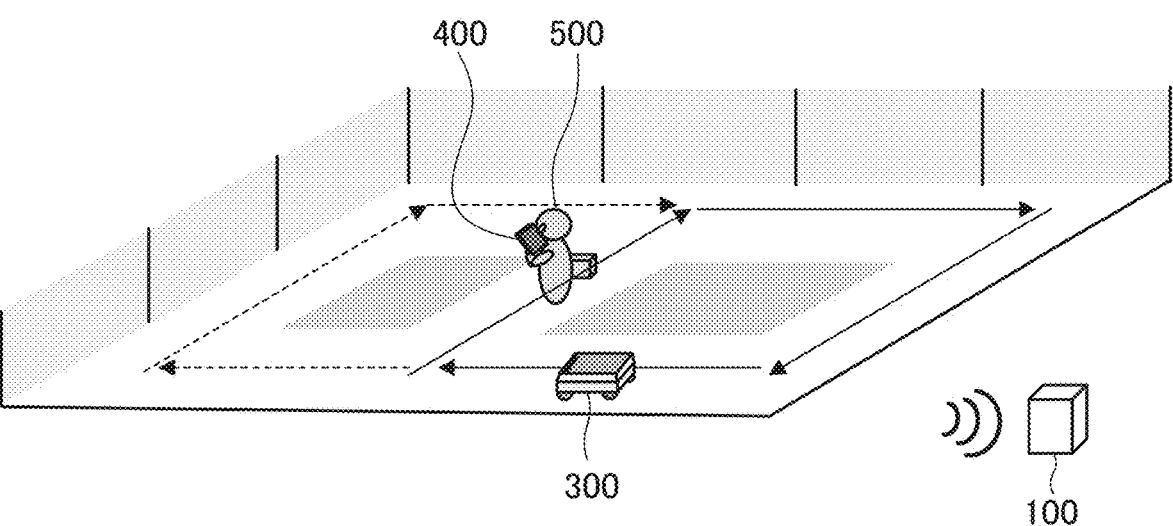
FIG. 3 is a diagram illustrating a use example of an information processing system according to the first embodiment.

FIG. 3 is a diagram illustrating a use example of an information processing system according to the first embodiment. FIG. 3 illustrates a situation in which the central management system 100 in which the information processing apparatus 200 is embedded is provided and the movable apparatus 300 is traveling along, for example, a rectangular course on a floor of a warehouse or the like to perform guiding work.

FIG. 3 illustrates a situation in which the worker 500 is performing work at a position at which traveling on a traveling route in which the movable apparatus 300 is performing guiding work is hindered. The communication terminal 400 carried by the worker 500 in the drawing is a smartphone or a tablet portable terminal communicating with the central management system 100 via a wireless network.

The information processing apparatus 200 performs control such that an instruction is transmitted to the movable apparatus 300 or the communication terminal based on the route plan information of the movable apparatus 300 or positional information of the movable apparatus acquired from the route planning system 101 and the degree of obstacle calculated by acquiring an image of the camera that is the sensor 107.

The degree of obstacle in the first embodiment is a numerical value indicating the easiness of movement of the worker 500 that is an obstacle object as the degree of obstacle, as described above. The easiness of movement is a numerical value that indicates easiness of movement of an obstacle object during evacuation and that is weighted in advance. Different values are allocated as easiness of movement according to work content of the worker 500 or an occupation area including working tools.

In the first embodiment, an example in which a movable apparatus detects the worker 500 that is an obstacle to traveling using map information and an image captured by the camera and notifies the communication terminal 400 of the worker 500 so that both the movable apparatus and the worker avoid each other will be described. The movable apparatus acquires an occupation region of the worker and calculates easiness of movement.

Then, the degree of obstacle of the worker 500 is calculated based on the easiness of movement and an instruction for movement of the worker is given via the communication terminal 400 carried by the worker. The movable apparatus 300 performs control for adjusting a way of the movable apparatus on the route course without bypassing to another route course.

In the control of the movable apparatus 300, waypoint navigation in which a plurality of transit points are sequentially followed using the transit points formed by positions and orientations set on a coordinate system of the map information is performed. In the first embodiment, information regarding the transit points is three parameters of angle values of a direction and 2-dimensional positional coordinates.

The movable apparatus 300 performs control such that a distance and orientation and an orientation difference between a transit point of interest and the calculated position decrease. The movable apparatus 300 repeatedly focuses attention on a subsequent transit point and moves when the distance and the orientation difference are equal to or less than a given distance. It is assumed that a speed between the transit points, a turning angle at each transit point, or the like can be set.

The route planning system 101 provided in the central management system 100 retains the route information such as a map or transit points for determining a traveling route of the movable apparatus 300 according to the first embodiment. Based on a route plan or an instruction of the route planning system 101, the movable apparatus 300 is assumed to determine the traveling route.

Figure 4:
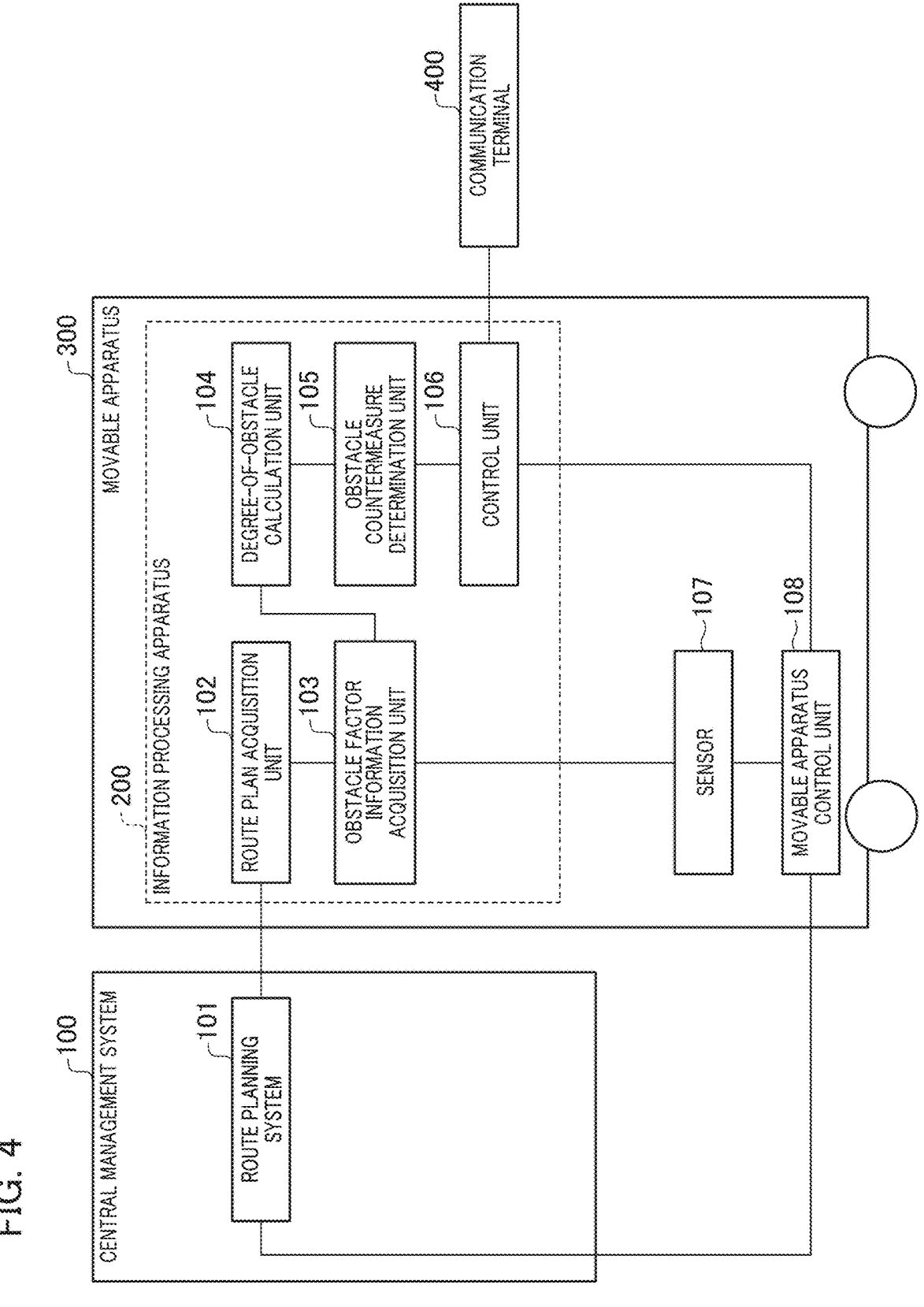
FIG. 4 is a functional block diagram illustrating another configuration example of the information processing system.

In the information processing system in FIG. 1, the information processing apparatus 200 is mounted on the central management system 100 and an instruction is given to the movable apparatus 300 or the communication terminal 400 via a network. However, the information processing apparatus 200 may be mounted on the movable apparatus 300. FIG. 4 is a functional block diagram illustrating another configuration example of the information processing system. The information processing apparatus 200 is mounted on the movable apparatus 300.

Figure 5:
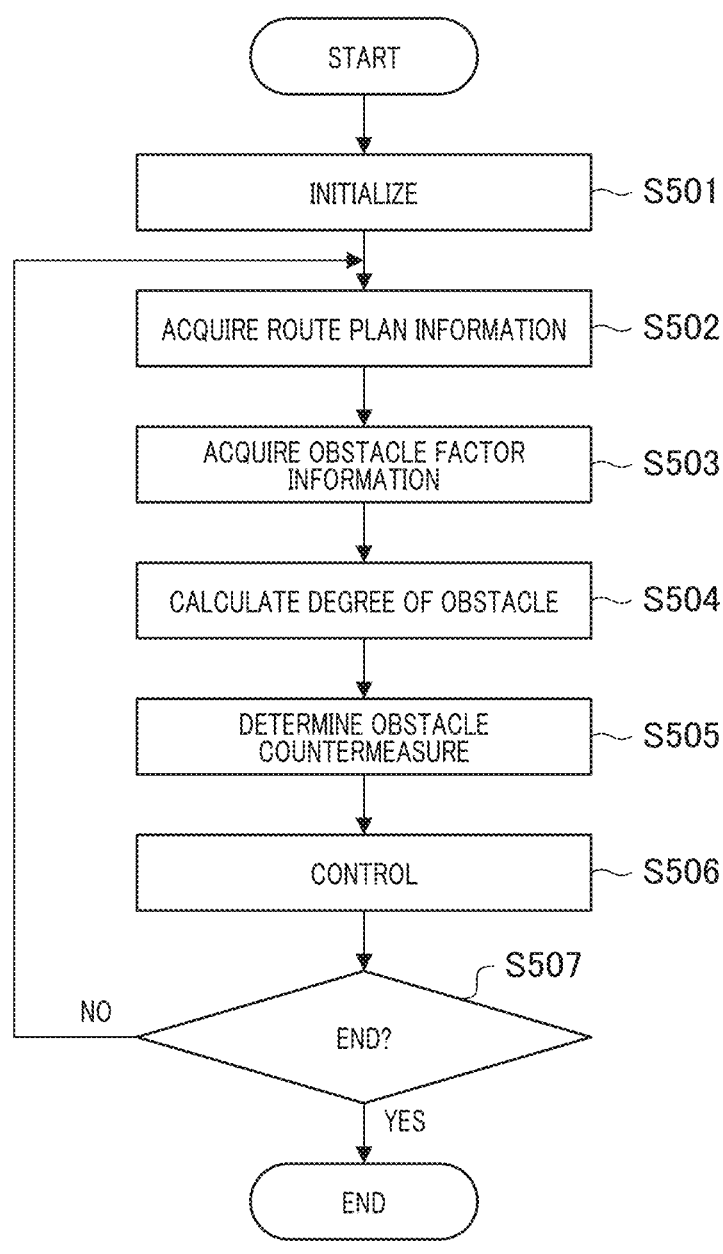
FIG. 5 is a flowchart illustrating an example of a processing flow of an information processing method by the information processing apparatus 200 according to the first embodiment of the present disclosure.

FIG. 5 is a flowchart illustrating an example of a processing flow of an information processing method by the information processing apparatus 200 according to the first embodiment of the present disclosure. The flowchart of FIG. 5 is assumed to be implemented by causing the CPU 201 serving as a computer to execute a computer program stored in a memory serving as a storage medium.

The processing flow of FIG. 5 starts automatically when the information processing apparatus 200 starts with start of the central management system 100. In step S501, the information processing apparatus 200 initializes the system.

That is, information regarding the worker or an image for detecting the worker is read from an image and a set value or a parameter stored in the ROM 202, and an initialization process is performed on a parameter of the camera of the movable apparatus 300 or a memory used for calculation of the CPU 201. In the initialization process of step S501, data retained in advance in the ROM 202 or the external memory 204 is read to the RAM 203.

The data read in the initialization process of step S501 includes, for example, an image used to detect an obstacle object, identification information of a detected obstacle object, and identification information for identifying a type of work if the obstacle object is a worker. The data includes information regarding the easiness of movement of an obstacle object used to calculate the degree of obstacle or an obstacle countermeasure for the obstacle object and information used to calculate evacuation cost of the obstacle object, a time necessary for evacuation, and the degree of loss caused due to stop or delay of guiding work.

Subsequently, in step S502, the route plan information is acquired from the route planning system 101. Here, step S502 functions as a route plan acquisition step (a route plan acquisition unit) of acquiring a route plan of the movable apparatus.

The route plan information includes information regarding a map or transit points for specifying a movement route during traveling of the movable apparatus 300, information regarding a width, a shape, or the like of a traveling passage, and information regarding a size and a present position of the movable apparatus 300 and priority of guiding work. The acquired route plan information is output to the obstacle factor information acquisition unit 103.

Subsequently, in step S503, the obstacle factor information acquisition unit 103 acquires an image of the movable apparatus 300 by the sensor 107 and detects an obstacle object that hinders traveling of the movable apparatus 300. An occupation region of the detected obstacle region is calculated and a type of work identified from the image of the detected obstacle object is acquired.

Then, the occupation region and the type of work are transmitted together with the route plan information acquired from the route plan acquisition unit 102 as the obstacle factor information to the degree-of-obstacle calculation unit 104. Here, step S503 functions as an obstacle factor information acquisition step (an obstacle factor information acquisition unit) of acquiring information regarding an obstacle factor that hinders a way of the route plan of the movable apparatus.

Any method may be used as an obstacle object detection method. In the first embodiment, a difference region is extracted using a background difference from a passage image captured in advance, and an obstacle object is detected using pattern matching with an image of a worker, or a work tool or the like of the worker stored in advance in a memory.

Figure 6:
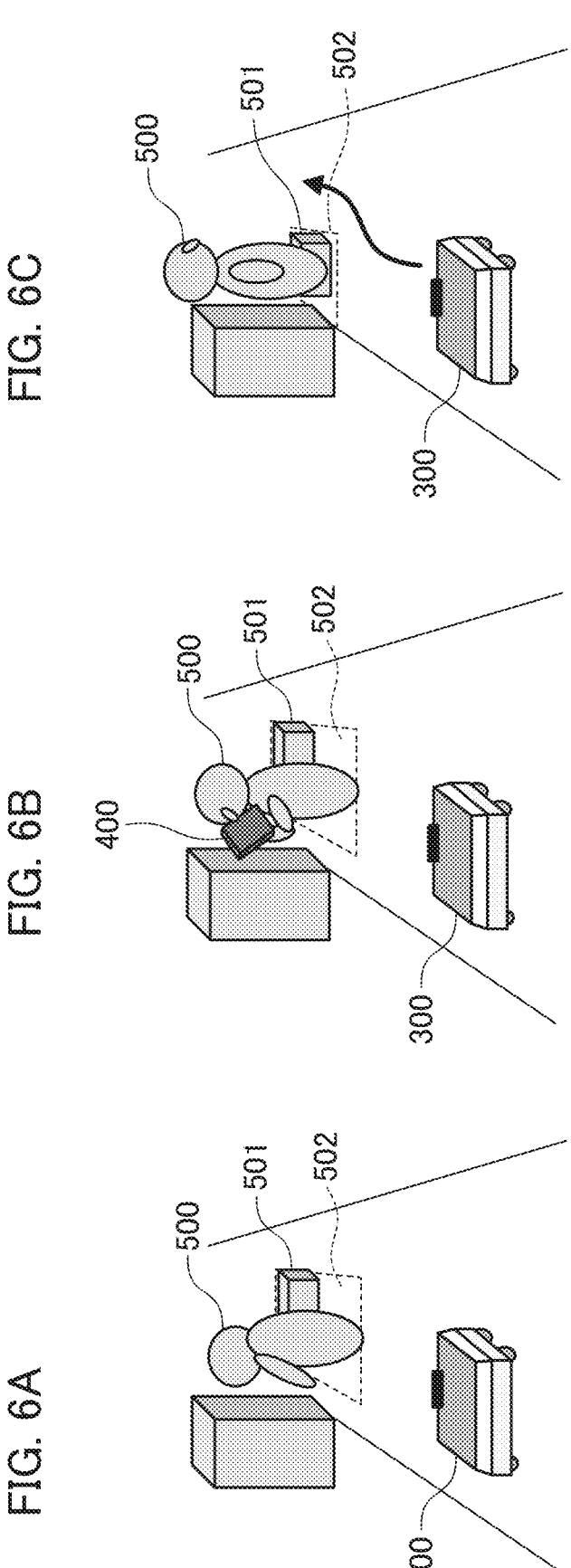
FIGS. 6A to 6C are diagrams illustrating examples of movements of a movable apparatus 300 and a worker 500 according to the first embodiment.

For the occupation region, an occupation region on a passage is calculated using a region of a worker or a work tool in a captured image and information regarding a size of a region of a passage in the captured image and a width or a shape of the passage acquired in the route plan information. FIGS. 6A to 6C are diagrams illustrating examples of movements of the movable apparatus 300 and the worker 500 according to the first embodiment.

As a calculation example of an occupation region, as in FIG. 6A, an occupation region 502 is calculated by projecting a region occupied by the worker 500 and the work tool 501 to a plane of a passage.

In the first embodiment, there is a passage on a coordinate system of a map used to estimate an own position of the movable apparatus 300, and a position or a size of the projected occupation region 502 is calculated based on an offset value with which a position and an orientation of the camera of the movable apparatus 300 can be specified. When an obstacle object is not detected, a value of an occupation region is 0.

In step S503, a type of work is identified using an image of a worker that is the detected obstacle object and identification information of the work. The identification information of the work is information for specifying the type of work of the worker. The type of work is specified by detecting an image of a working wear of the worker or a device or a tool used for specific work by pattern matching. Alternatively, the type of work may be identified by reading a QR code or the like attached to the worker, the device, a tool, or the like.

In step S503, when the occupation region of the detected obstacle object or information regarding the type of work of the worker is set as obstacle factor information and the obstacle factor information acquisition unit 103 transmits the obstacle factor information and the route plan information to the degree-of-obstacle calculation unit 104, the process proceeds to step S504.

In step S504, the degree-of-obstacle calculation unit 104 calculates the degree of obstacle that hinders traveling of the movable apparatus 300 due to the obstacle object as the degree of obstacle based on the acquired route plan information and obstacle factor information.

In the first embodiment, the easiness of movement is first calculated and the degree of obstacle is calculated using the calculated easiness of movement. Here, step S504 functions as a degree-of-obstacle calculation step (a degree-of-obstacle calculation unit) of calculating the degree of obstacle for the route plan of the movable apparatus based on the information regarding the obstacle factor.

For the easiness of movement, a value corresponding to a size of an occupation region and a type of work of a worker or obstacle object is selected in advance from values for predetermined easiness of movement read to the RAM 203. When M is easiness of movement, A is an occupation area of a worker, and Cm is a coefficient of easiness of evacuation for each unit area, the easiness of movement can be calculated using the following Formula 1, for example.

$$M = Cm \times A \qquad \text{(Formula 1)}$$

Cm indicates a coefficient value determined in advance for each worker that is an obstacle object or each type of work and is smaller as a movement amount of the worker is larger.

In the first embodiment, easiness of movement is calculated for two types of obstacle countermeasures in a case where a worker evacuates to a predetermined evacuation place away from a present passage position and a case where a worker temporarily moves and evacuates to a passage side. The degree-of-obstacle calculation unit 104 calculates a degree-of-obstacle group based on the easiness of movement to a plurality of candidates of the obstacle countermeasures.

That is, in the first embodiment, it is considered that the easier movement is, the smaller the degree of obstacle is. The degree of obstacle indicating an obstruction of the worker by evacuation of an obstacle object is calculated based on the easiness of movement.

In the first embodiment, as described above, an example in which the degree of obstacle is calculated for each of two obstacle countermeasures including obstacle countermeasure 1 in which a worker moves and evacuate to an evacuation place away from a present position and obstacle countermeasure 2 in which a worker evacuates to a corner of a passage will be described. However, the degree of obstacle may be calculated for each of three or more obstacle countermeasures.

In the first embodiment, when D is the degree of obstacle and M is easiness of movement, the degree of obstacle is calculated using the following Formula 2, for example.

$$D = 1/M \qquad \text{(Formula 2)}$$

When the degree-of-obstacle group that is the degree of obstacle of each of obstacle countermeasure 1 and obstacle countermeasure 2 is calculated in step S504, the degree-of-obstacle calculation unit 104 transmits an identification information group of the obstacle countermeasures and the degree-of-obstacle group to the obstacle countermeasure determination unit 105.

Subsequently, in step S505, the obstacle countermeasure is determined based on the degree of obstacle acquired by the obstacle countermeasure determination unit 105 in step S504. The obstacle countermeasure determination unit 105 determines whether the degree of obstacle of evacuation of the worker 500 that is an obstacle object is less than a predetermined threshold for bypass determination of the movable apparatus 300 determined in advance.

Here, step S505 functions as an obstacle countermeasure step (an obstacle countermeasure determination unit) of determining an obstacle countermeasure for reducing the degree of obstacle based on the information regarding the obstacle factor and the route plane.

For example, when the degree of obstacle of one of obstacle countermeasure 1 and obstacle countermeasure 2 is less than the predetermined threshold for the bypass determination, the obstacle countermeasure is adopted and determined in step S505.

For example, when all the degrees of obstacle calculated by the degree-of-obstacle calculation unit 104 are the value less than the threshold for the bypass determination of the movable apparatus 300, the lowest obstacle countermeasure is adopted and determined among the degrees of obstacles of evacuation of the worker 500.

For example, when obstacle countermeasure 2 for evacuation of the worker to a passage side on a traveling route is adopted and determined as the obstacle countermeasure, the movable apparatus 300 adjusts a traveling position in the passage of the traveling route and travels on a passage side opposite to the passage side to which the worker 500 is evacuated.

On the other hand, when the degrees of obstacles of obstacle countermeasure 1 and obstacle countermeasure 2 are higher than the predetermined threshold for the bypass determination of the movable apparatus 300, the movable apparatus 300 changes the route plan and determines an obstacle countermeasure for bypass to another traveling route, that is, determines that obstacle countermeasure 3 for bypass is adopted as the obstacle countermeasure.

In step S505, the obstacle countermeasure determination unit 105 transmits information regarding the determined obstacle countermeasure to the control unit 106, and then the process proceeds to step S506. In step S506, the control unit 106 controls the movable apparatus 300 based on the determined obstacle countermeasure.

That is, for example, when the obstacle countermeasure is a method of changing the route plan for bypass by the movable apparatus 300, the control unit 106 transmits an instruction for changing the traveling route to the movable apparatus 300. In this case, control on an instruction to the worker 500 that is an obstacle object is not performed.

If the obstacle countermeasure is, for example, a method of not changing and bypassing the route plan of the movable apparatus 300 and the worker that is an obstacle object is evacuated to an evacuation place away from the traveling route, the control unit 106 performs control such that an instruction for evacuating the worker that is an obstacle object is given. In this case, the control for the instruction to the movable apparatus 300 may not be performed. Alternatively, when the evacuation of the worker is completed, the movable apparatus 300 may be notified of the completion of the evacuation.

Further, when the obstacle countermeasure is a method of not changing and bypassing the route plan of the movable apparatus 300 and is obstacle countermeasure 2 in which the worker that is an obstacle object is evacuated to a passage side on the traveling route, the control unit 106 gives an instruction for evacuation to the worker that is an obstacle object. Furthermore, the control unit 106 performs control on the movable apparatus 300 such that a traveling position is adjusted in a passage on the traveling route and the movable apparatus 300 travels to a passage side opposite to the passage side to which the worker is evacuated.

That is, in the first embodiment, the communication terminal 400 of the worker is notified of, for example, evacuation to the left end of a passage and an instruction to avoid the worker and travel on the right end side of the passage is given to the movable apparatus 300.

Even in this case, when the evacuation of the worker is completed, the movable apparatus 300 may be notified of the completion of the evacuation. Here, step S506 functions as a control step (a control unit) of performing at least one of control on the obstacle factor and control of the movable apparatus based on the obstacle countermeasure.

FIG. 6B is a diagram illustrating an example in which the communication terminal 400 notifies the worker 500 of evacuation for audio or screen display. As an example, as illustrated in FIG. 6C, the worker 500 is evacuated to a corner of a passage (passage side) along with the work tool 501.

The movable apparatus 300 adjusts a traveling position and travels so that the movable apparatus 300 travels on the passage side opposite to a side of the evacuation position of the worker 500 in the passage. In this way, in the first embodiment, the control unit 106 transmits an evacuation instruction to the predetermined communication terminal 400 owned by or included in the obstacle object (the worker 500, the work tool, or the like) that is an instruction factor.

In step S506, when the control unit 106 performs control, the process proceeds to step S507. In step S507, it is determined whether the process of the information processing apparatus 200 ends. In the first embodiment, when a command to give an instruction to end control of autonomous traveling of the movable apparatus 300 is input from a user via an input unit (not illustrated), the processing flow of FIG. 5 ends. When the instruction to end the control is not given, processes of steps S502 to S507 are repeatedly performed.

As described above, in the first embodiment, when a worker hindering traveling of the movable apparatus 300 is detected, the degree of obstacle is calculated, an obstacle countermeasure is determined based on the calculated degree of obstacle, and at least one of notification control on the worker 500 and control of the movable apparatus 300 is performed.

That is, in the first embodiment, at least one of control of a change in a traveling route of the movable apparatus and control of a reduction in the degree of obstacle of an obstacle object that is an obstacle factor (for example, control for evacuation of an obstacle object) is performed. In other words, at least one of control for causing the obstacle factor evacuate and control for the movable apparatus to avoid the obstacle factor based on the obstacle countermeasure is performed.

Accordingly, when the worker is evacuated inside the passage, the movable apparatus 300 can pass along a scheduled route. Therefore, when a reduction in work efficiency of the worker 500 is not large, the reduction in the work efficiency can be inhibited further than when the route of the movable apparatus 300 is considerably changed for bypass.

Modified Example 1-1

In the first embodiment, the information processing apparatus 200 notifies the worker 500 that is performing work of an evacuation instruction and adjusts a traveling position of the movable apparatus 300 so that the movable apparatus 300 travels. That is, the control unit 106 gives an instruction to adjust an evacuation position of the worker 500 and a traveling position of the movable apparatus 300.

On the other hand, in a modified example, the information processing apparatus 200 adjusts evacuation and traveling positions via the communication terminal 400 of the worker 500. The control unit 106 transmits a message for inquiring about "the movable apparatus is scheduled to travel on, for example, the left side of a passage as a traveling schedule position and to which side can the worker be evacuated between the right and left of the passage?" to the communication terminal 400.

When a response indicating that the worker 500 "can be evacuated to the right" is returned based on a response input to the communication terminal 400 by the worker 500, control is performed such that the movable apparatus 300 travels as it is. When a response indicating that the worker 500 "can be evacuated to the right" is returned, control is performed such that the traveling position is adjusted to the right for travel. In this way, the traveling position of the movable apparatus 300 may be adjusted in response to a result of exchange with the communication terminal of the worker 500.

Modified Example 1-2

The example in which an obstacle object is detected from an image of the camera of the movable apparatus 300 has been described, but another method may be used. For example, the degree of obstacle may be calculated using positional information of the communication terminal 400 of the worker 500 and information regarding an occupation area registered in the work management system. The traveling position of the movable apparatus 300 may be adjusted based on the positional information of the communication terminal 400 after the evacuation.

Modified Example 1-3

In the first embodiment, the example in which the easiness of movement determined for each type of work of the worker is used has been described. However, the easiness of movement is not limited to the type of work of the worker. The easiness of movement can also be calculated in accordance with a weight or a volume of the worker or the work tool that is an obstacle object. When the easiness of movement is calculated, a work man-hour necessary for work preparation or withdrawal can also be used.

Here, it is assumed that W is a weight of an obstacle object, V is a volume of the obstacle object, E is a work man-hour, Cw is a coefficient indicating easiness of evacuation for each unit weight, Cv is a coefficient indicating easiness of evacuation for each unit volume, and Ce is a coefficient indicating easiness of evacuation for each unit work man-hour. In this case, the easiness of movement M can be calculated by, for example, following Formulae 3 to 5.

$$M = Cw \times W \qquad \text{(Formula 3)}$$

$$M = Cv \times V \qquad \text{(Formula 4)}$$

$$M = Ce \times E \qquad \text{(Formula 5)}$$

Further, the degree of easiness of movement can be applied to an unmovable obstacle object such as a fixture on a passage, a width of the passage, a neglected thing, a hole or a fracture of the passage, or the like. For the easiness of movement in the case of an unmovable obstacle object, the degree of obstacle is calculated using a predetermined constant Mmin. Mmin may be a predetermined constant so that Mmin is a minimum value in a calculation value group of other easiness M of movement.

In this way, the degree of obstacle is calculated based on the easiness of movement and the easiness of movement is calculated based on at least one of a weight of an obstacle object that is an obstacle factor, a volume of the obstacle object, a work man-hour by the obstacle object, and whether the obstacle object can move.

Modified Example 1-4

In the first embodiment, the example in which the information processing apparatus 200 performs control such that the worker 500 and the movable apparatus 300 avoid each other has been described. However, instead of mutual avoidance, only the worker 500 and the work tool may be evacuated to an appropriate position.

In the present modified example, the control unit 106 notifies the communication terminal 400 of the worker 500 of an instruction for evacuation to a position not obstructing traveling of the movable apparatus 300 based on information regarding the traveling route of the route plan of the movable apparatus 300.

Modified Example 1-5

In the first embodiment, as described above, the information processing apparatus 200 calculates the degree of obstacle and performs control after the worker 500 starts of the work. However, before the work is started, the degree of obstacle may be calculated from a work schedule of the worker 500 and the control may be performed.

Figure 7:
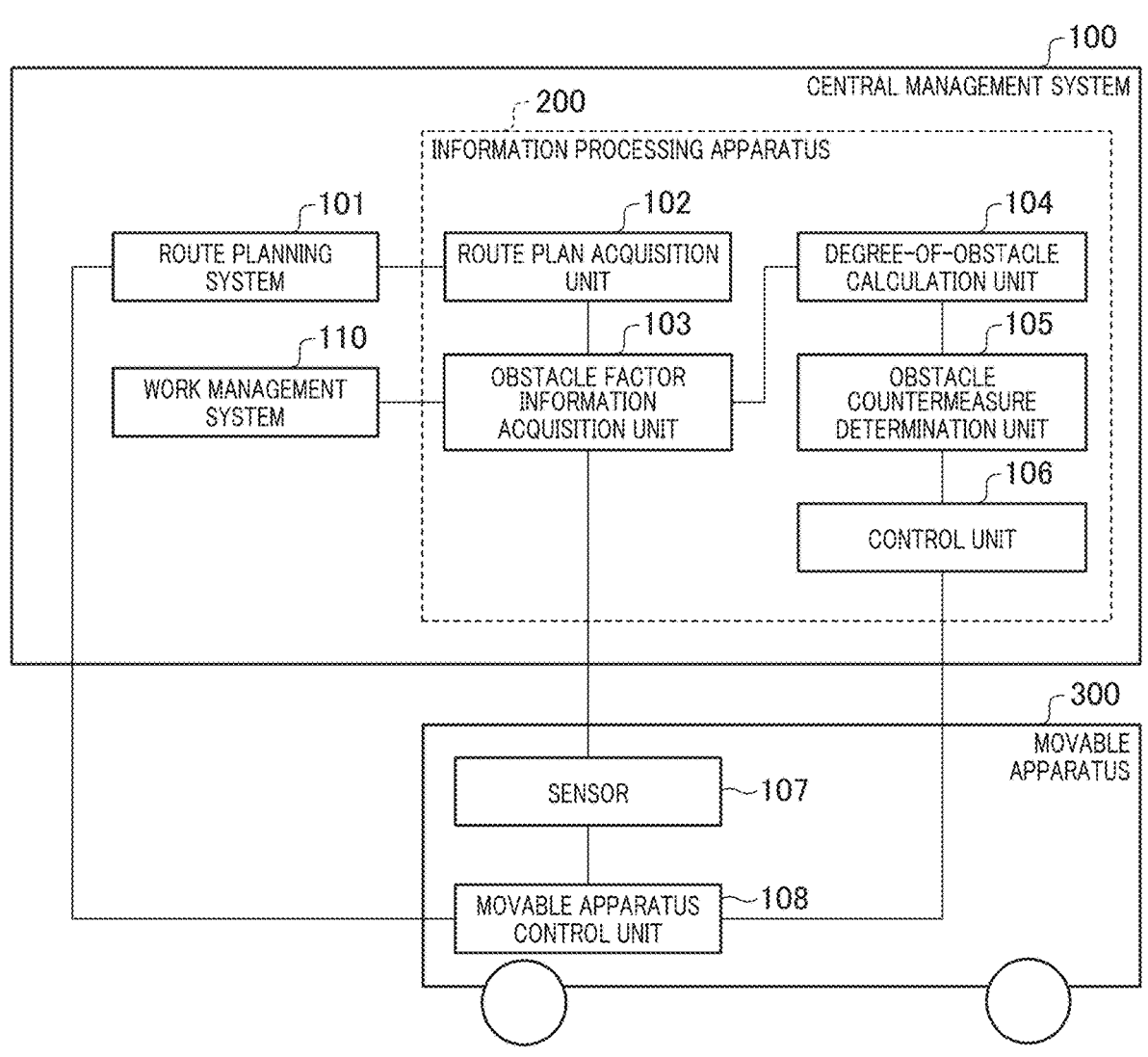
FIG. 7 is a diagram illustrating a partial configuration example according to Modified Example 1-5 of the present disclosure.

FIG. 7 is a diagram illustrating a partial configuration example according to Modified Example 1-5 of the present disclosure. As illustrated in FIG. 7, the central management system 100 may include a work management system 110.

When a work schedule of a worker is input in advance, the degree of obstacle may be calculated based on the work schedule.

That is, in FIG. 7, the obstacle factor information acquisition unit 103 acquires, as work schedule information, at least one piece of information such as a position at which work is performed, an occupation area, a work schedule time, and a work time from a work management system 109. The degree-of-obstacle calculation unit 104 calculates the degree of obstacle of the worker 500 when a work schedule is set in an order similar to that of the first embodiment.

When the value of the degree of obstacle based on the work schedule information of the worker 500 is less than a predetermined threshold for bypass determination of the movable apparatus 300, the obstacle countermeasure determination unit 105 determines a change in the work schedule of the worker 500 and the control unit 106 instructs the work management system 109 to change the work schedule.

Modified Example 1-6

In the first embodiment, as described above, the information processing apparatus 200 identifies the type of work from an image of the worker 500. However, the type of work may be acquired in accordance with another method. For example, the obstacle factor information acquisition unit 103 may acquire the type of work of the worker on the traveling route from the above-described work management system 110.

The worker 500 may use the communication terminal 400 to input information regarding the type of work and the obstacle factor information acquisition unit 103 may acquire information regarding the type of work from the communication terminal 400.

Second Embodiment

In the first embodiment, as described above, the information processing apparatus 200 calculates the degree of obstacle based on the easiness of movement of the worker. A second embodiment is different in that the degree of loss in the case of evacuation of the worker 500 that is an obstacle factor and loss by bypass of the movable apparatus 300 is used as the degree of obstacle.

A configuration of the information processing apparatus 200 according to the second embodiment is the same as the configuration of FIG. 1 and a process according to the second embodiment is substantially similar to the process according to the first embodiment. Hereinafter, differences from the first embodiment will be described with reference to the flowchart of FIG. 5. Start of the process is the same as the start of the first embodiment. Steps S501 and S502 are similar to the steps of the first embodiment, and therefore description thereof will be omitted.

In step S503, the obstacle factor information acquisition unit 103 detects an obstacle object in accordance with a method similar to that of the first embodiment and transmits information regarding the worker such as the type of work as obstacle factor information to the degree-of-obstacle calculation unit 104, and the process proceeds to step S504.

In step S504, the degree-of-obstacle calculation unit 104 calculates, as the degree of obstacle, the degree of loss that can hinder guiding work of the movable apparatus 300 due to occupation of the passage by the worker and the degree of loss that is caused due to evacuation of the worker as follows.

That is, in the second embodiment, loss cost due to work delay as a loss of the work end is calculated as the degree of obstacle. When Nw is the number of times the movable apparatus 300 passes within an occupation time of the worker, Tw is a delay time for each evacuation of the worker, and CL is a loss cost coefficient for each unit time of the work delay, the degree of obstacle Dw in the case of evacuation of the worker is calculated using the following Formula 6.

$$Dw = Cw \times Tw \times Nw \qquad \text{(Formula 6)}$$

The degree of obstacle Dw in Formula 6 is calculated for each obstacle countermeasure when there is a plurality of selectable evacuation methods (obstacle countermeasures) of the worker 500.

When Nm is the number of times the movable apparatus 300 bypasses and travels during a passage occupation time of the worker 500, Tm is a delay time for each bypass route, and Cm is a loss cost coefficient per unit time of guiding work delay, the degree of obstacle Dm in the case of bypass of the movable apparatus 300 is calculated using, for example, Formula 7.

$$Dm = Cm \times Tm \times Nm \qquad \text{(Formula 7)}$$

The degree of obstacle Dw in Formula 7 is calculated for each route when there are a plurality of routes along which the movable apparatus 300 can bypass.

In step S504, the degree-of-obstacle calculation unit 104 calculates the degree-of-obstacle group and transmits the degree-of-obstacle group to the obstacle countermeasure determination unit 105. Thereafter, the process proceeds to step S505. In step S506, the obstacle countermeasure determination unit 105 determine an obstacle countermeasure based on the degree of obstacle calculated in step S504.

In step S505, an obstacle countermeasure in which the degree of obstacle is the smallest is determined in the degree-of-obstacle group based on the loss. In the second embodiment, the degree of obstacle is compared from a degree-of-obstacle group based on the loss of the work of the worker and a degree-of-obstacle group based on a loss of the guiding work of the movable apparatus 300. The second embodiment is different from the first embodiment in that the value of the degree of obstacle is the minimum and, for example, an obstacle countermeasure for evacuating only the worker 500 is determined.

In step S505, the obstacle countermeasure determination unit 105 transmits information regarding the obstacle countermeasure determined by the control unit 106, and then the process proceeds to step S506. In step S506, for example, in the foregoing example, the control unit 106 controls transmission of evacuation notification to the communication terminal 400 of the worker 500. The other orders are similar to those of the first embodiment. After the control is performed, the process proceeds to step S507. The order of step S507 is similar to that of the first embodiment, and therefore description thereof will be omitted.

As described above, in the second embodiment, based on the degree of obstacle based on the loss cost due to work delay of the worker and the degree of obstacle based on loss cost due to avoidance of an obstacle object by the movable apparatus, an obstacle countermeasure for evacuation by the worker is determined and the evacuation notification of the worker is controlled.

In such a configuration, by performing control in accordance with a method in which the degree of obstacle is lower based on the loss of the work of the worker 500 and the loss of the guiding work of the movable apparatus 300, it is possible to reduce deterioration in work efficiency of the worker 500 and the movable apparatus 300.

Modified Example 2-1

In the second embodiment, the example in which the loss cost occurring due to the guiding work of the movable apparatus 300 and the work of the worker 500 is used as the degree of obstacle has been described, but the present disclosure can be embodied even when another loss may be used. For example, an increase in a work time of the work delay of the movable apparatus 300 and the worker 500 may be used as the degree of obstacle.

An increase distance of a movement route length of the movable apparatus 300 or an evacuation route length of the worker 500 may be used as the degree of obstacle. Alternatively, the degree of obstacle may be calculated based on a product of power necessary for movement, an increase in distance, and a predetermined coefficient.

Modified Example 2-2

In the second embodiment, the example in which the loss cost of the movable apparatus 300 and the work of the worker 500 is used as the degree of obstacle has been described. In the present modified example, however, the degree-of-obstacle calculation unit 104 calculates the degree of obstacle of both the loss cost and the easiness of movement as the degree of obstacle of the worker.

The obstacle countermeasure determination unit 105 determines an obstacle countermeasure based on the degree of obstacle of the easiness of movement of the worker, the degree of obstacle of the loss cost, and the degree of obstacle of the movable apparatus 300. A method of determining an obstacle countermeasure in which the degrees of obstacles of the easiness of movement of the worker and the loss cost may be a method of determining any combination.

For example, a weighted sum of the degree of obstacle based on the easiness of movement of the worker 500 and the degree of obstacle of the loss cost may be used as the degree of obstacle of the worker. The easiness of movement of the worker 500 may be used only to determine bypass of the movable apparatus 300 and the degree of obstacle based on the loss cost may be used for an evacuation method for the worker 500.

In this way, the degree-of-obstacle calculation unit 104 may calculate the degree of obstacle based on at least one of the easiness of movement of an obstacle object that is an obstacle factor, a loss occurring due to removal of the obstacle object that is an obstacle factor, and a loss occurring due to a change in the route of the movable apparatus 300. The loss includes at least one of cost and time.

Modified Example 2-3

In the calculation of the degree of obstacle according to the first embodiment, priority or work details of the worker 500 may be applied. That is, the obstacle factor information acquisition unit 103 acquires the priority and the work details of the detected worker 500 from the work management system 109. In the case of work details with priority higher than a loss of the guiding work of the movable apparatus 300, the degree of obstacle is calculated so that work of the worker 500 is an obstacle larger than the guiding work.

Third Embodiment

Next, a third embodiment will be described. In the first and second embodiments, an obstacle object is detected from an image captured by a monochromic stereo camera, the degree of obstacle of the detected obstacle object is calculated, and an obstacle countermeasure is determined. However, the detection of the obstacle object is not limited to use of the stereo camera.

For example, a monocular camera, a color camera, or a depth camera may be used. Alternatively, a radar, a 2-dimensional 2D light detection and ranging (LiDAR), or a 3-dimensional 3D LiDAR may be used to detect an obstacle object on a route on which the movable apparatus 300 travels.

Modified Example 3-1

In the first and second embodiments, the example in which the obstacle countermeasure is determined based on the degree of obstacle and an obstacle countermeasure is performed has been described. In the present modified example, if a predetermined threshold is provided for the degree of obstacle and the degree of obstacle is equal to or less than the threshold, the obstacle countermeasure determination unit 105 determines a record of the degree of obstacle rather than control of a movable apparatus or control of movement of an obstacle object.

Then, the control unit 106 records the degree of obstacle along with the calculated position and orientation. When the degree of obstacle is slight, the degree of obstacle is recorded and accumulated as a log in the RAM 203 or the external memory 204 without performing the obstacle countermeasure and information indicating the degree of obstacle on a traveling route based on the past accumulated degree of obstacle is displayed on the display unit 206.

In this way, from the past accumulated degree of obstacle, a user can ascertain a place where a slight obstacle occurs during traveling of the movable apparatus 300 or a position at which work of the worker and the movable apparatus is improved in the future.

Modified Example 3-2

In the first and second embodiments, the example in which the worker 500 or the work tool 501 is detected as an obstacle object has been described. However, a robot such as a movable AGV or another movable apparatus can also be detected as an obstacle object.

That is, the obstacle object includes other movable apparatuses. Positional information and an occupation area of an AGV or another movable apparatus that is an obstacle is acquired from the route planning system and the degree of obstacle and the easiness of movement of evacuation of the AGV or the other movable apparatus is calculated.

An obstacle countermeasure is determined based on the calculated degree of obstacle so that the AGV or the other movable apparatus performs evacuation, and the AGV or the other movable apparatus is notified of the evacuation. When the obstacle object is a movable apparatus managed by the route planning system 101 similarly to the movable apparatus 300, the control unit 106 may notify the route planning system 101 so that the route plan of the movable apparatus that is an obstacle object is changed. That is, the control unit 106 may transmits an evacuation instruction to the other movable apparatus.

Further, when an apparatus or luggage that cannot travel autonomously is an obstacle object, the present modified example can be applied. The central management system 100 performs notification control such that another movable apparatus such as a robot with an arm or a manned forklift removes an apparatus or luggage that is the obstacle object.

Modified Example 3-3

The forgoing degree of obstacle can also be displayed on a graphical user interface (GUI). In a map image in a division where the movable apparatus 300 or the worker 500 performs work, the degree of obstacle at each position of an obstacle object (the worker 500 and the like) on the traveling route of the movable apparatus 300 may be displayed with a numerical value or color.

Alternatively, before the worker 500 starts work, the degree of obstacle may be displayed at a desired position of the traveling route of the movable apparatus 300 on the map for each work schedule period of time. Alternatively, when a work schedule is planned with a work schedule table of the worker 500, a numerical value or a color of the degree of obstacle of the movable apparatus 300 associated with the work may be displayed.

Modified Example 3-4

In the first and second embodiments, the control example in which the control unit 106 transmits an evacuation notification to the communication terminal 400 carried by the worker 500 has been described. However, the present disclosure is not limited to the communication terminal 400. The worker may be allowed to move by a voice announcement within a working place and display on a display device within the working place.

While the present disclosure has been described with reference to exemplary embodiments, it is to be understood that the disclosure is not limited to the disclosed exemplary embodiments. The scope of the following claims is to be accorded the broadest interpretation to encompass all such modifications and equivalent structures and functions.

For example, the foregoing Formulae 1 to 7 may be used in appropriate combination. The foregoing embodiments and modified examples may be appropriately combined.

When the movable apparatus 300 is controlled, it is desirable to perform control such that a speed of the movable apparatus 300 decreases to a predetermined speed or less at the time of passing of an obstacle object. At the time of passing, it is desirable to issue a warning to the worker 500 by an alarm sound or the like.

When the worker 500 evacuates, a rule regarding which side the worker evacuates to the right or left of a passage may be set in advance. Accordingly, it is possible to smoothly perform control at a time at which the worker 500 and the movable apparatus 300 pass each other.

In the above-described embodiments, the examples in which the present disclosure is applied to an autonomous movable apparatus have been described. However, the movable apparatus according to the present embodiment is not limited to an autonomous movable apparatus such as an AGV or an AMR. The movable apparatus may be a movable apparatus that performs a driving assistant method although the movable apparatus does not completely autonomously move.

The movable apparatus may be any apparatus as long as the movable apparatus such as an automobile, a train, a ship, an airplane, a robot, or a drone can move. Even when the movable apparatus is controlled remotely, the present disclosure can be applied. The embodiments and the modified examples include the following combinations.

In addition, as a part or the whole of the control according to the embodiments, a computer program realizing the function of the embodiments described above may be supplied to the information processing apparatus or the like through a network or various storage media. Then, a computer (or a CPU, an MPU, or the like) of the information processing apparatus or the like may be configured to read and execute the program. In such a case, the program and the storage medium storing the program configure the present disclosure.

The present disclosure includes embodiments realized using, for example, at least one processor or circuit configured to function of the embodiments explained above. For example, a plurality of processors may be used for distribution processing to perform functions of the embodiments explained above.

This application claims the benefit of priority from Japanese Patent Application No. 2023-064611, filed on Apr. 12, 2023, which is hereby incorporated by reference herein in its entirety.

What is claimed is:

1. An information processing apparatus comprising:
at least one memory storing instructions; and
at least one processor that upon execution of the stored instructions is configured to function as:
   a route plan acquisition unit configured to acquire a route plan of a movable apparatus;
   an obstacle information acquisition unit configured to acquire information regarding at least one obstacle hindering the acquired route plan of the movable apparatus;
   a degree-of-obstacle calculation unit configured to calculate a group of degree-of-obstacles for the route plan of the movable apparatus based on the acquired information regarding the at least one obstacle, wherein the group of degree-of-obstacles includes a degree-of-obstacle for the movable apparatus to move by changing the route plan and a degree-of-obstacle for the at least one obstacle to evacuate;
   an obstacle countermeasure determination unit configured to determine an obstacle countermeasure for reducing the group of degree-of-obstacles based on the acquired information regarding the at least one obstacle and the acquired route plan; and
   a control unit configured to at least one of control transmission of an evacuation instruction to the at least one obstacle to evacuate and control the movable apparatus to move along a path that avoids the at least one obstacle.

2. The information processing apparatus according to claim 1, wherein execution of the stored instructions further configures the at least one processor to calculate the degree-of-obstacles based on at least one of easiness of movement of the at least one obstacle, a loss occurring by removal of the at least one obstacle, and a loss occurring due to a route change of the movable apparatus.

3. The information processing apparatus according to claim 2, wherein at least one of the loss occurring by removal of the at least one obstacle and the loss occurring due to a route change of the movable apparatus includes at least one of cost and time.

4. The information processing apparatus according to claim 2, wherein the easiness of movement is calculated based on at least one of a weight of the at least one obstacle, a volume of the at least one obstacle, work man-hours of the at least one obstacle, and whether the at least one obstacle is movable.

5. The information processing apparatus according to claim 1, wherein execution of the stored instructions further configures the at least one processor to performs at least one of control for changing a traveling route of the movable apparatus and control for reducing the degree-of-obstacle by the at least one obstacle based on the obstacle countermeasure.

6. The information processing apparatus according to claim 1, wherein execution of the stored instructions further configures the at least one processor to transmit an evacuation instruction to a predetermined communication terminal included in an object among the at least one obstacle.

7. The information processing apparatus according to claim 6, wherein the at least one obstacle includes another movable apparatus and the control unit transmits the evacuation instruction to the other movable apparatus.

8. A movable apparatus comprising:
at least one memory storing instructions; and
at least one processor that upon execution of the stored instructions is configured to function as:
   a route plan acquisition unit configured to acquire a route plan of a movable apparatus;
   an obstacle information acquisition unit configured to acquire information regarding at least one obstacle hindering the acquired route plan of the movable apparatus;
   a degree-of-obstacle calculation unit configured to calculate a group of degree-of-obstacle for the route plan of the movable apparatus based on the acquired information regarding the at least one obstacle, wherein the group of degree-of-obstacles includes a degree-of-obstacle for the movable apparatus to move by changing the route plan and a degree-of-obstacle for the at least one obstacle to evacuate;
   an obstacle countermeasure determination unit configured to determine an obstacle countermeasure for reducing the degree-of-obstacles based on the acquired information regarding the at least one obstacle and the acquired route plan; and
   a control unit configured to at least one of control transmission of an evacuation instruction to the at least one obstacle to evacuate and control the movable apparatus to move along a path that avoids the at least one obstacle; and
a driving control unit configured to control movement of the movable apparatus based on an output of the control unit.

9. An information processing method comprising:
acquiring a route plan of a movable apparatus;
acquiring information regarding at least one obstacle hindering the acquired route plan of the movable apparatus;
calculating a group of degree-of-obstacles for the route plan of the movable apparatus based on the acquired information regarding the at least one obstacle, wherein the group of degree-of-obstacles includes a degree-of-obstacle for the movable apparatus to move by changing the route plan and a degree-of-obstacle for the at least one obstacle to evacuate;

determining an obstacle countermeasure for reducing the group of degree-of-obstacles based on the acquired information regarding the at least one obstacle and the acquired route plan; and performing at least one of control of transmission of an evacuation instruction and control for the movable apparatus to move along a path that avoids the at least one obstacle.

10. A non-transitory computer-readable storage medium storing instructions that, when executed by at least one processor of an information processing apparatus, causes a control method to be executed, the control method comprising:

acquiring a route plan of a movable apparatus;

acquiring information regarding at least one obstacle hindering the acquired route plan of the movable apparatus;

calculating a group of degree-of-obstacles for the route plan of the movable apparatus based on the acquired information regarding the at least one obstacle, wherein the group of degree-of-obstacles includes a degree-of-obstacle for the movable apparatus to move by changing the route plan and a degree-of-obstacle for the at least one obstacle to evacuate;

determining an obstacle countermeasure for reducing the group of degree-of-obstacles based on the acquired information regarding the at least one obstacle and the acquired route plan; and performing at least one of control of transmission of an evacuation instruction to the at least one obstacle to evacuate and control the movable apparatus to move along a path that avoids the at least one obstacle.

* * * * *